(12) United States Patent
Sherman et al.

(10) Patent No.: US 6,540,800 B2
(45) Date of Patent: Apr. 1, 2003

(54) ABRASIVE PARTICLES WITH METALLURGICALLY BONDED METAL COATINGS

(75) Inventors: Andrew J. Sherman, Granada Hills, CA (US); Animesh Bose, Fort Worth, TX (US)

(73) Assignee: Powdermet, Inc., Sun Valley, CA (US)

( * ) Notice: Subject to any disclaimer, the term of this patent is extended or adjusted under 35 U.S.C. 154(b) by 0 days.

(21) Appl. No.: 09/732,834

(22) Filed: Dec. 7, 2000

(65) Prior Publication Data

US 2002/0069592 A1 Jun. 13, 2002

Related U.S. Application Data

(60) Provisional application No. 60/169,549, filed on Dec. 7, 1999.

(51) Int. Cl.[7] .............................. C09K 3/14; B24D 3/00; B24D 5/00; B24D 7/00
(52) U.S. Cl. .............................. 51/309; 51/295; 51/293; 51/307
(58) Field of Search .......................... 51/309, 307, 295, 51/293; 428/403, 404; 427/212, 214, 215, 217

(56) References Cited

U.S. PATENT DOCUMENTS 5,049,164 A  * 9/1991 Horton et al. ................ 51/293
5,889,219 A  * 3/1999 Moriguchi et al. ........... 419/13

* cited by examiner

Primary Examiner—Michael Marcheschi
(74) Attorney, Agent, or Firm—Bruce A. Jagger

(57) ABSTRACT

An abrasive composite particle comprising a cubic abrasive core particle encapsulated within a deposit of hexagonal metallurgical bond forming material comprising at least about 50 volume percent rhenium, ruthenium, osmium or mixtures thereof. The metallurgical bonds serve to retain the core particle in a matrix/binder very strongly. Metallurgical bonds are formed by the encapsulating material taking into solution, at the interface with the cubic abrasive core particle, some element or compound from the abrasive particle such as, for example, carbon or cubic boron nitride, from the core particle. Chemical bonds are not formed between the abrasive particle and the deposit. Suitable abrasive core particles include diamond, cubic carbides, cubic borides, cubic nitrides, cubic oxides, and the like. Conventional fabrication procedures such as chemical vapor deposition are employed to form the metallurgical bond forming deposit on the core particle. The composite abrasive particles are useful in forming articles according to conventional powdered metal processing operations. The articles so formed are useful for their hardness as well as their abrasiveness.

34 Claims, No Drawings

ABRASIVE PARTICLES WITH METALLURGICALLY BONDED METAL COATINGS

Applicant claims the benefit of Provisional Application Ser. No. 60/169,549 filed Dec. 7, 1999.

BACKGROUND OF THE INVENTION

1. Field of the Invention

The invention relates in general to abrasive core particles metallurgically bonded to a metal deposit, and, in particular, to core abrasive particles metallurgically bonded to encapsulating coatings comprising ruthenium, rhenium, osmium, alloys, and mixtures thereof, and to composites and abrasive compacts containing such coated abrasive particles, and to methods of preparing such coated abrasive particles, composites and abrasive compacts.

2. Description of the Prior Art

Abrasive particles have long been embedded in various matrix/binder materials for use as cutting tools, grinding wheels, and the like. Abrasive particles have also been utilized to lend hardness to articles where no abrasion is involved. Difficulty had been experienced in retaining the abrasive particles in the matrix/binder materials. Various expedients had been proposed to improve the retention and/or wetting of the abrasive core particles in the matrix/binder materials. It is well known to coat abrasive core particles with metal coatings so as to, inter alia, improve the retention of the abrasive core particles in a matrix/binder material. Typically, such metal coatings had relied on the formation of a chemical bond with the abrasive core particles for their retention properties. For example, with carbon containing abrasive core particles such as diamond or metal carbides, metal coatings had been selected for their ability to form carbides, or for their ability to wet carbon at high temperatures. Titanium, chromium, zirconium, and tungsten, for example, react to form a carbide with the carbon in diamond or carbide, which results in the formation of a chemical bond between the carbide forming element and a diamond or carbide abrasive core particle. Metals that form chemical bonds in this manner are typically described as active metals. Generally, the active metals also exhibited good adhesion reception with respect to the common metallic, resin, ceramic, or the like matrix/binder materials. It had previously been proposed that as an alternative to active metals and carbide formers, non-carbide forming cubic metals, such as cobalt, nickel, palladium, and platinum could be used to improve wettability and retention of diamonds and carbide materials. Such cubic materials are isostructural with cubic metal carbides and diamond. Such cubic materials also have high solubilites for carbon at elevated temperatures (typically at temperatures above one half the melting point of the cubic metals). A combination of metallurgical and mechanical bonds is typically formed between such cubic metals and diamond, cubic metal carbides, borides, nitrides, oxides, and the like. Other metals, such as copper, have also been used solely to promote wetting while only providing a mechanical bond to the abrasive grains.

Other prior proposed expedients for improving the retention of abrasive particles had included, for example, etching or otherwise modifying the surface of the abrasive particle to improve mechanical bonding.

Abrasive core particles generally comprise, for example, diamond, cubic metal carbides, cubic metal borides, cubic metal nitrides, cubic metal oxides, other ceramics, and the like, of various elements. Abrasive core particles, whether in compact or discrete form, are generally used to form tools, wear components, hardfacing alloys, and the like. Earth or rock drilling and boring tools such as are used, for example, in the mining and oil production fields are particularly benefited from the present invention. Metal working tools also benefit from the present invention. Typically, coated abrasive particles made according to the present invention are mounted to a tool holder, the nature of which is dictated by the intended use. Typical mounting procedures include, for example, sintering, brazing, casting, plasma spraying, thermal spraying, or the like to form coatings or compacts. Single particles can be mounted, if desired. Often, the particles are formed into a composite of a desired configuration, and the preformed composite is then mounted to the tool holder. For some applications a binder/matrix that incorporates the abrasive particles is formed to the desired configuration in situ on the tool holder.

Reliance on chemical bonding for abrasive core particle retention limits the elements that can be employed for retention purposes. Chemical bonds form interfacial materials at the boundary between the surface of the particle and the overlaying deposit. Such materials are generally not ductile so the chemical bonds are susceptible to being broken by thermal and mechanical shock, which undesirably reduces the particle retentive capacity of the coating system.

Those concerned with these problems recognize the need for improvement.

BRIEF SUMMARY OF THE INVENTION

A preferred embodiment of the coated abrasive core particles according to the present invention comprises a deposit formed in situ on the surface of an abrasive core particle, which deposit forms a metallurgical bond, rather than a chemical bond with the abrasive core particle. The deposit comprises a non carbide forming hexagonal metal, which has a melting point above about 1,000 degrees centigrade, and forms a metallurgical bond with the abrasive particle. The metals that meet these criteria are ruthenium, rhenium and osmium. Cobalt, which had previously been proposed for use in bonding diamonds, has a hexagonal polymorph, however, the stable structure above 450 degrees centigrade is the cubic phase. In this cobalt is analogous to nickel.

The use of a hexagonal refractory metal from the group ruthenium, rhenium and osmium unexpectedly results in stabilization of the diamond, metal carbide, boride, nitride, oxide, or the like, structure, even though the hexagonal lattice is not isomorphous with the cubic diamond structure. This is contrary to what previous understandings of these materials generally suggested. For example, cubic metals are isostructural with diamond, while hexagonal metals are isostructural with graphite. This would seem to suggest that the hexagonal metal would destabilize cubic structures such as diamond, carbide or other abrasives. Also, cubic metals such as nickel, and the high temperature allotrope of cobalt, tend to be more ductile and have higher solubility for carbon than do the hexagonal metals. This also would seem to suggest away from the use of refractory hexagonal metals to retain diamonds, carbides and other abrasives in binder/matrix materials. Unexpectedly, it has been found that these hexagonal refractory metals are particularly effective in retaining diamonds, metallic carbides, borides, nitrides, oxides, and the like abrasive particles. The high temperature capabilities, strengths and other inherent characteristics of the refractory metals contribute substantially to the retention of the abrasive particles, and to other desirable properties of the abrasive loaded binder/matrix articles that are made with such abrasive particles.

The use of hexagonal refractory metals to retain cubic nitride, boride and oxide abrasive particles provides very satisfactory results. Without wishing to be bound by any theory, the following is believed to be one possible explanation for this. The borides, nitrides (if formed), and oxides of ruthenium, rhenium and osmium are much less stable than the borides, nitrides and oxides of which the abrasive particles are formed. The abrasive borides, nitrides or oxides (non-carbides) are slightly soluble in the hexagonal refractory metal. Thus, a small amount of these non-carbides dissolves in the hexagonal refractory metal without the formation of brittle intermetallics, or the like. This provides a very good metallurgical bond.

Metallurgical bonds are formed between different materials when one material is soluble-in the other, without any significant chemical reaction. That is, a metallurgical bond is formed when the materials form solid solutions at the interface between them without forming intermediate compounds. Metallurgical bonds or solid solutions between metals and abrasive core particles tend to be more ductile than chemical bonds. Metallurgical bonds are thus generally able to withstand more or different mechanical and thermal shocks than chemical bonds. For example, ruthenium and rhenium form solid solutions with carbon, so deposits of these metals on diamonds form metal-carbon solid solutions at the interface with the diamond. Heat treating the composite particles, followed by rapid cooling tends to enhance the strength of metallurgical bonds.

In general, the composite abrasive particles according to the present invention comprise at least abrasive core particles that have deposits, preferably encapsulating deposits, of a metal which forms a metallurgical bond with one or more of the constituents of the abrasive core particles. Such constituents include, for example, carbon, borides, nitrides, oxides, and the like. The abrasive core particles generally exhibit a hardness on Mohs scale of hardness in excess of about 7. Quartz exhibits a hardness of 7, and diamond is 10 on this scale.

Conventional procedures can be used to form the deposit in situ on the surfaces of the abrasive core particle. Such procedures include, for example, chemical vapor deposition, electroless deposition, physical vapor deposition, sputtering, salt deposition, and the like. The deposits, generally layers, are generally formed in situ from ions, atoms or nanoparticles that build up on the surfaces of the abrasive core particle to form the desired deposit. This is to be distinguished from a solid object that is formed at some other location and applied as a separate object to the surface of the particle. Preferably, the two-phase composite abrasive particle is heated to increase the thickness and nature of the interlayer. In general, the interlayer is a solid solution. Rapid cooling generally tends to retain the thickness and nature of the metallurgical bond.

The strength of the metallurgical bond is preferably enhanced by pre-treating the surface of the abrasive core particle. Such pre-treatments include, for example, the application of vacuum and heat to drive of volatiles, chemical or physical etching, or the like. Broadly, these procedures involve the cleaning of the surface. Ceramic abrasive core particles can be, for example, reduced or oxidized to enrich the species on the surface. As used herein, unless otherwise indicated, the word "cleaning" is intended to include all such surface enhancement operations.

The preferred deposit morphology is a continuous encapsulating deposit of approximately uniform thickness. Other deposit morphologies such as crystalline, dendritic, discontinuous, or the like can be employed, if desired. The abrasive core particles can be of any shape, for example, spherical, jagged irregular, regular crystalline, fibrous, flat flake, or the like. Typically, any production run of particles will exhibit a statistical distribution of sizes and shapes around some predetermined norm.

Various optional deposits can be applied to the composite abrasive particle for various purposes. Bonding aids can be deposited in situ over the metallurgically bonded deposit. Such bonding aids are selected so that they adhere well to both the metallurgically bonded deposit and a matrix/binder into which the composite particles are to be dispersed. Such bonding aids typically include, for example, metals such as iron, iron based alloys, nickel, nickel based alloys, and cobalt and cobalt based alloys, mixtures thereof, alloys thereof, and the like. Bonding aids can be formed in situ using, for example, the procedures described for the formation of the metallurgically bonded coatings. Bonding aids are generally applied as an overcoating on the metallurgically bonded deposit, and they are capable of wetting the surface to which they are applied. The resulting composite particles are still conveniently described as "two-phase composite particles" because the overcoatings are generally alloyed with the metallurgically bonded deposit.

Particularly when the composite abrasive particles are to be used in fabrication procedures such as brazing, plasma spraying, or the like where the binder/matrix material is caused to melt, a diffusion limiting barrier can be applied over the metallurgically bonded deposit. Such a diffusion barrier limits the intermingling of the metallurgically bonded deposit with the molten matrix so as to protect the metallurgical bond between the deposit and the abrasive core particle. Such diffusion barriers are known and include, for example, titanium carbide, chromium carbide, and the like. Such diffusion barriers are preferably very thin, in the order of approximately a few hundred Angstroms thick. They function to prevent the molten binder/matrix material from disrupting the metallurgical bond, not to contribute significantly to the abrasive qualities of the composite. Thus, a diamond abrasive core particle coated with an encapsulating layer of formed in situ metallurgically bonded rhenium, and a flash coating of aluminum oxide, exhibits abrasive qualities primarily because of the core particle, not significantly because of the flash coating. The flash coating protects the metallurgical bond by preventing the molten binder/matrix material from disrupting it.

Generally, the applications where abrasive particles are used entail the use of some binder/matrix material in addition to the metallurgically bonded deposit. In some applications, however, the composite abrasive particles are sintered, compressed or fused so that the metallurgically bonded deposits serve to bond adjacent particles together into a compact without the addition of any additional binder/matrix material.

The composite abrasive materials disclosed here are described for the sake of convenient reference as abrasives, however, it will be understood by those skilled in the art that these composite materials also find utility in non-abrasive applications. For example, these materials find application where the characteristic of hardness, or some other characteristic, is desired, without regard to whether abrasion is involved. The term "abrasive" is intended to include all such hard core particles whether they are used or are capable of being used as abrasives.

The composite abrasive materials disclosed here are typically formed as discrete particles, however, if desired, particularly with very fine particles, agglomerates of a few (less than approximately 6 particles) fine abrasive core particles can be coated with metallurgical bond forming material. Such small agglomerates are intended to be included within the phrase, "abrasive core particles".

Matrix/binder materials that are generally suitable for use with composite abrasive particles according to the present invention include, for example, metals such as iron, iron based alloys, nickel, nickel based alloys, cobalt and cobalt based alloys, copper, copper based alloys, chromium based alloys, mixtures thereof, alloys thereof, and the like. Brazing materials such as, for example, gold, silver, copper, nickel, gallium, tin, mixtures and alloys thereof are also generally suitable for such use. Vitreous matrix/binders can also be used. The selection of a particular metallurgical bond forming deposit, or bonding agent, is influenced by the nature of the matrix/binder that is to be used for mounting the composite abrasive particles. Where the matrix/binder is a metal, it is generally preferred that such deposits or bonding agents form alloys with the metallic matrix/binder. The matrix/binder will preferably wet the surface of the composite particle to which it is exposed. This promotes the retention of the abrasive core particle in the finished article. These materials are conveniently described as "matrix/binder" materials because they generally serve both functions. That is, they are generally the continuous phase in the finished article, which is composed of a plurality of composite abrasive grains. And they serve to hold the multi-grains together in a single coherent article of a desired predetermined shape.

The composite abrasive particles can be formed into useful articles employing a wide variety of procedures as is generally known with regard to powdered metals. Such procedures include, for example, sintering, brazing, casting, thermal or plasma spraying, wire arc transfer, D-gun, or the like. These particles can also, for example, be incorporated into electro formed abrasive products, and the like.

Other objects, advantages, and novel features of the present invention will become apparent from the following detailed description of the invention.

DETAILED DESCRIPTION OF SOME PREFERRED EMBODIMENTS

The present invention provides its benefits across a broad spectrum of powder metallurgy. While the description which follows hereinafter is meant to be representative of a number of such applications, it is not exhaustive. As those skilled in the art will recognize, the basic teachings herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring now to a preferred embodiment for purposes of illustration only and not limitation, titanium carbide powder (TiC) powder, which had a size range of 5 to 250 microns and an average particle size of about 100 microns, was fluidized in a quartz chamber. An encapsulating substantially uniform coating of rhenium was applied to the discrete TiC core particles using conventional chemical vapor deposition procedures. Gaseous rhenium pentachloride was used to deposit a substantially uniform coating of rhenium on the diamond particles. Rhenium fluoride, or rhenium carbonyl are equally suitable precursors. The TiC core particles were in a fluidized state, which contributed to the continuity and uniformity of the rhenium coating on the discrete particles. The thickness of the coating of rhenium ranged from about 1 to 25 microns with a nominal value of about 15 microns. The coating was carried out at a temperature of from about 300 to 1000 degrees centigrade. The resulting coated powders were rapidly cooled in the fluidized bed itself. The resultant composite particulate was a TiC superabrasive core substantially uniformly covered with rhenium. At the interface between the rhenium coating and the TiC core particle, the rhenium had some carbon in solution. Rhenium does not form carbides, but it does takes some carbon in solution. Thus, there is a metallurgical bond at the interface between the TiC and the rhenium.

The thus formed rhenium coated TiC powders were then mixed with Fe-2Ni powder in the ratio of about 60 volume percent of the nickel steel and 40 volume percent of coated superabrasive. The powders were blended and then pressed into small rectangular pads. The as pressed pads were subsequently introduced into a hot pressing die with graphite die and punches. The material was hot pressed around 900 degrees centigrade to almost full density. The TiC particles were very strongly retained in the resulting compact.

In another embodiment, the rhenium coated TiC powder is mixed with a nickel based alloy powder. This powder mixture is then fed through the orifice of a plasma spray gun on to a surface that is to be hardfaced. The nickel in the alloy melts and bonds very well to the rhenium and the substrate surface. An excellent hardface coating is thus formed on the substrate surface. Cobalt based alloy powders also produce excellent results. Applying the mixture of powders using an HVOF gun also produces an excellent hardface.

In another embodiment, the rhenium coated TiC powder is mixed with a low melting point nickel-based brazing alloy in the ratio of 70 volume percent of the brazing alloy and 30 volume percent of the superabrasive. This brazing alloy and the superabrasive particle mixture can then be formed into a slurry and coated on to a substrate, or incorporated into a brazing rod. The substrate with the slurry painted braze alloy and superabrasive particle mixture can then be heated to melt the braze alloy. The nickel-based alloy then forms an excellent bond with rhenium, which already has an existing metallurgical bond with the TiC superabrasive core particle. This leads to an excellent material in which the abrasive particles are very strongly retained.

A diamond abrasive powder ranging in particle size between 1200 and 20 mesh is placed into a steel fluidized bed reactor. The diamond powder is then coated with an encapsulating layer of rhenium metal using the hydrogen reduction of rhenium fluoride at 600 degrees centigrade. The rhenium coating is applied to a thickness of between about 0.5 and 25 microns in thickness. Rhenium does not form chemical bonds with diamond (carbon), but it does form metallurgical bonds that include carbon in solution. Such metallurgical bonds are formed with the diamond and the rhenium. This coated diamond powder is then blended with a nickel braze alloy, BNi4. The resultant blended, coated diamonds are then applied as a coating to a tool bit such as that used in oil exploration and the drilling of oil wells. The coating is applied using a suitable organic binder, which burns out cleanly between 350 and 600 degrees centigrade, but holds the mixture in place for the next processing step. The coated tool article is then heat treated at 940–1150 degrees centigrade for a short time, preferably less than 5 minutes, to cause the nickel braze alloy to melt and form a composite coating containing the coated diamond particles.

The organic binder is burned out completely. The diamond particles are very tightly retained in the coating.

In an alternate application method, the blended coated diamond particles are fed through the orifice of an HVOF spray gun where the brazing alloy is melted. The melt is cooled as the particles hit the substrate, forming the desired coating incorporating the tightly retained coated diamond particles.

In an alternate application, the nickel braze alloy may be blended with addition fine rhenium powder and with fine tungsten carbide powder to reduce dissolution of the rhenium coating and increase the hardness and wear resistance of the braze material. This tends to protect the metallurgical bonds between the diamond and the rhenium coating, and to thus aid in the retention of the diamond core particles in the coating of braze material.

In a further embodiment, diamond powder with an average particle size of around 100 microns is taken in a fluidized bed chamber, A volatile ruthenium compound is used for the chemical vapor deposition of ruthenium on the surface of the diamond particles, The fluidization helps to make the coating uniform. The metallic ruthenium is deposited on the diamond particles at an elevated temperature of around 350 degrees centigrade. The diamond particles are, therefore, substantially uniformly encapsulated with a coating of ruthenium. The ruthenium coating thickness is approximately 2 microns. The ruthenium has some carbon in solution due to the CVD process itself, however, a heat treatment step wherein the coated powder is heated to about 1000 degrees centigrade and held there for about an hour allows the incorporation of more carbon in the ruthenium at the interface with the diamond. The ruthenium is believed to take into solution around 3 atomic percent of carbon. The solubility decreases with temperature. The heat treated particles are cooled rapidly, all of which results in the a metallurgical bond between the diamond and the ruthenium coating due to the incorporation of carbon into solution in ruthenium.

The metallurgically bonded ruthenium coated diamond powder may then be protected by partially coating the exposed surface of the ruthenium with a layer of a low diffusing compound such as TiC, $Cr_3C_2$, or $Al_2O_3$. The diffusion limiting compound serves as an interlayer between the ruthenium and a matrix/binder material. The diffusion limiting barrier limits the dissolution of the ruthenium into, for example, nickel or other alloy matrix.

The discrete ruthenium coated particles may, for example, be coated with a layer of nickel before being incorporated into a matrix/binder. The nickel coating is also applied by a chemical vapor deposition operation using, for example, a nickel carbonyl precursor. The nickel carbonyl, at a temperature of around 190 degrees centigrade decomposes into nickel and carbon monoxide gas. When the decomposition of the nickel carbonyl gas is obtained in a fluidized bed of ruthenium coated particles, the particles are substantially uniformly coated with nickel. This nickel coating serves as a binder aid on the discrete particles. This further serves to protect the metallurgical bond between the ruthenium and the diamond.

The diamond superabrasives particles that are first coated with and metallurgically bonded to ruthenium, and then coated with nickel, act as composite powder particles in forming useful articles. The second coating of nickel is compatible with both ruthenium and the normal matrix materials that are used to produce bonded tools and hardfacing materials. In general, the nickel is wetted by the conventional matrix/binder materials.

According to one embodiment, the double coated diamond particles are mixed with an iron-copper alloy powder. The powders are taken in the ratio of 50:50 and blended in a V-blender for half an hour. The blended powders are poured into a graphite hot pressing die cavity with the inner punch inserted. The top punch is then inserted into the die cavity and the die and punch assembly with the powder in it is inserted into a hot press chamber. The composite material is then consolidated at 800 degrees centigrade using a pressure of around 10 pounds per square inch. This results in a fully dense material in which the core diamond particles are very tightly retained.

In another embodiment, the double coated powder is mixed with prealloyed bronze powder in a V-blender. The powder mixture is then clad on to a steel surface by the application of pressure (using cold isostatic pressing). The clad material is then introduced into a hot isostatic pressing chamber where the material is processed by heating at 800 degrees centigrade for one hour at a pressure of 15,000 pounds per square inch. This results in a hardfacing surface that is well clad with the central steel part, and in which the core diamond particles are very tightly retained.

In a further embodiment, triangular ploycrystalline diamond compacts (0.125 inches on each side) are introduced into a tumbling bed reactor. The diamond compacts in the tumbling reactor are heated to 450 degrees centigrade, and a reactant gas consisting of approximately 10 percent rhenium carbonyl in a hydrogen carrier gas is introduced to the reactor. The rhenium plates out as the metal on the compact. The reaction is allowed to proceed until the rhenium coating on the exposed faces of the diamond particles in the compact reaches from about 3 to 10 microns. The resulting rhenium coated polycrystalline diamond compacts are then brazed onto a rock drill bit. A BNi-1-10 alloy, which has a melting point between 1000 and 1100 degrees centigrade, is used as the brazing alloy. The rhenium coated compact exhibits excellent wettability and bond strength to the steel substrate. Also, the diamond particles exhibit excellent retention properties in the compact.

Repeating these examples using, for example, osmium in place of rhenium or ruthenium produces very tightly bonded diamond particles. Likewise, the use of mixtures of these elements produces strong metallurgical bonds. Where desired, multiple layers of the same or different metallurgical bond forming materials can be employed with very satisfactory results. Repeating these examples using alloy coatings in which more than about 50 percent by volume of the constituent elements are rhenium, ruthenium, or osmium produces compacts in which the core particles are metallurgically bonded to the deposit. Such alloys are conveniently formed by the co-deposition of the constituent elements using conventional chemical vapor deposition procedures. Suitable alloying elements include, for example, nickel, iron, palladium, chromium, tungsten, molybdenum, cobalt, boron, gallium, silver, copper, gold, mixtures thereof, or the like. Such alloying elements are selected and provided in such amounts that the metallurgical bond formed between the deposit and the abrasive particle is not significantly impaired.

Repeating these examples using particles of cubic boron nitride, TiC, TiN, SiC, $TiB_2$, $B_4C$, or the like, as the core particles results in the formation of strong metallurgical bonds with coatings comprising rhenium, ruthenium, or osmium.

The deposit of metallurgically bonding material typically ranges in thickness from about 1 to 60 percent, more or less, of the core particle average size. The deposit should be thick enough that the metallurgical bond will survive subsequent processing. Where the matrix/binder is to be melted, the deposit is generally required to be thicker than with, for example, cold pressing. The thickness of the coating can also be used to control other properties, such as density, if desired. In general, the deposit of metallurgically bonding material comprises from about 5 to 75 volume percent of the composite particle.

The present invention finds particular application when applied to fine powders with average particle sizes in the range of from about 0.1 to 500 microns. The particle size and shape are generally dictated by the nature of the end use. Powders within this range are suitable, for example, for use as hardfacing brazing or welding rod where loose powder is placed inside of a tube that is melted to apply the hardfacing to a substrate, as raw material for a thermal spray, as feed stock for hot consolidation techniques such as hot pressing, hot isostatic pressing, as raw material for various conventional sintering operations, and the like. These powders are likewise suitable for use in the formation of compacts as well as coatings. These powders can be formed by conventional fabrication procedures to near net shaped articles.

The metallurgical bond forming deposits, as described herein, can be formed by a variety of coating techniques, including, for example, fused salt deposition, electroless coating, chemical vapor deposition, physical vapor deposition, and various solution-reaction-precipitation procedures. Suitable deposits are formed with metallurgical bonds of the nature described hereinabove. Such bonded powders are suitable for use in the fabrication procedures described hereinabove.

The metallurgical bond forming deposits can be formed on abrasive particles that have been previously combined into a compact or the like. Thus, the particles need not be in the form of separate discrete grains to enjoy the benefits of the present invention.

What has been described are preferred embodiments in which modifications and changes may be made without departing from the spirit and scope of the accompanying claims. Obviously, many modifications and variations of the present invention are possible in light of the above teachings. It is therefore to be understood that, within the scope of the appended claims, the invention may be practiced otherwise than as specifically described.

What is claimed is:

1. A composite abrasive particle comprising:
   an abrasive core particle;
   a metallic deposit metallurgically bonded to said abrasive core particle, said metallic deposit being selected from the group consisting of rhenium, ruthenium, osmium, and mixtures and alloys thereof.

2. A composite abrasive particle of claim 1 wherein said abrasive core particle comprises cubic boron nitride.

3. A composite abrasive particle of claim 1 wherein said abrasive core particle comprises diamond.

4. A composite abrasive particle of claim 1 wherein said abrasive core particle comprises cubic metal carbide.

5. A composite abrasive particle of claim 1 wherein said abrasive core particle comprises cubic metal boride.

6. A composite abrasive particle of claim 1 wherein said abrasive core particle comprises cubic metal nitride.

7. A composite abrasive particle of claim 1 wherein said abrasive core particle comprises cubic metal oxide.

8. A composite abrasive particle of claim 1 wherein said abrasive core particle is in the form of a compact and said compact is mounted to a substrate by a brazing material.

9. A composite abrasive particle of claim 8 wherein said abrasive core particle comprises diamond.

10. A composite abrasive particle of claim 1 wherein said abrasive core particle has an average size of approximately 0.1 microns to 0.25 inches.

11. A composite abrasive particle of claim 1 wherein said alloys comprise less than 50 volume percent of alloying metal selected from the group consisting of cobalt, boron, gallium, silver, copper, gold, nickel, iron, palladium, chromium, tungsten, molybdenum, and mixtures thereof.

12. A composite abrasive particle of claim 1 wherein said abrasive particle is in a discrete form.

13. A composite abrasive particle of claim 8 wherein said abrasive particle comprises cubic boron nitride.

14. A composite abrasive particle comprising:
    an abrasive core particle;
    a first metallic deposit metallurgically bonded to said abrasive core particle, said first metallic deposit comprising at least 50 volume percent of hexagonal refractory metal selected from the group consisting of rhenium, ruthenium, osmium, and mixtures thereof.

15. A composite abrasive particle of claim 14 including a diffusion limiting barrier on said first metallic deposit.

16. A composite abrasive particle of claim 14 wherein said first metallic deposit comprises a substantially uniform coating on said abrasive core particle.

17. A composite abrasive particle of claim 14 wherein said first metallic deposit comprises from approximately 5 to 75 volume percent of said composite abrasive particle.

18. A composite abrasive particle of claim 14 including a second metallic deposit on said first metallic deposit, said second metallic deposit being adhesion receptive to common matrix forming materials.

19. A composite abrasive particle of claim 14 wherein said abrasive particle is in the form of a compact and said compact is mounted to a tool holder.

20. A composite abrasive particle according to claim 18 wherein said second metallic deposit comprises at least one element selected from the group consisting of nickel, copper, iron, and mixtures and alloys thereof.

21. A composite abrasive particle according to claim 18 wherein said second metallic deposit comprises a brazing or welding alloy.

22. A method of forming a composite abrasive particle that comprises a core abrasive particle and a metallic deposit metallurgically bonded to said core abrasive particle, said method comprising:
    selecting a cubic abrasive core particle;
    cleaning a surface of said abrasive core particle;
    forming a metallic deposit on said clean surface to form a two-phase composite particle, said metallic deposit being selected from the group consisting of rhenium, ruthenium, osmium, and mixtures and alloys thereof;
    heating said two-phase composite particle at a temperature sufficient to promote the formation of a metallurgical bond between the phases of said two-phase composite particle;
    cooling said two-phase composite particle at a rate sufficient to maintain said metallurgical bond.

23. A method of forming a composite abrasive particle according to claim 22 including forming said metallic deposit to a thickness equal to approximately 1 to 60 percent of the average particle size of the abrasive core particle.

24. A method of forming a composite abrasive particle according to claim 22 including forming a second deposit on said metallic deposit after said metallic deposit is formed, said second deposit being selected from the group consisting of gold, silver, copper, nickel, iron, chromium, titanium, boron, molybdenum, gallium, tin, mixtures, and alloys thereof.

25. A multi-grain shaped article comprising a plurality of composite abrasive particles embedded in a matrix/binder, wherein the said composite abrasive particles comprise:
   an abrasive core particle;
   a first metallic deposit metallurgically bonded to said abrasive core particle, said first metallic deposit comprising at least 50 volume percent of metal selected from the group consisting of rhenium, ruthenium, osmium, and mixtures thereof.

26. A multi-grain shaped article of claim 25 in the form of a hardfacing.

27. A multi-grain shaped article of claim 25 in the form of a coating on a substrate.

28. A multi-grain shaped article of claim 25 in the form of a compact.

29. A multi-grain shaped article of claim 25 wherein said composite abrasive particles are embedded in a brazing alloy.

30. A multi-grain shaped article of claim 25 wherein said composite abrasive particles are embedded in a metallic matrix/binder.

31. A multi-grain shaped article of claim 25 wherein said composite abrasive particles are embedded in a vitreous matrix/binder.

32. A process of forming a shaped article comprising a plurality of composite abrasive particles, said process comprising:
   selecting an abrasive core particle having a clean surface;
   forming a metallic deposit on said clean surface to form a two-phase composite particle, said metallic deposit being selected from the group consisting of rhenium, ruthenium, osmium, and mixtures and alloys thereof;
   heating said two-phase composite particle at a temperature sufficient to promote the formation of a metallurgical bond between the phases of said two-phase composite particle;
   cooling said two-phase composite particle at a rate sufficient to maintain said metallurgical bond; and
   forming a plurality of said two-phase composite particles into a shaped article.

33. A process of forming a shaped articlr according to claim 32 wherein said forming a plurality of said two-phase composite particles comprises placing a plurality of said two-phase composite particles in an unconsolidated form in a tube and melting the tube to form a layer of molten tube containing a plurality of said two-phase composite particles embedded therein.

34. A process of forming a shaped article according to claim 33 including combining said two-phase composite particles in said tube with a powdered brazing alloy, and said melting including melting said powdered brazing alloy to form a layer of molten brazing alloy containing a plurality of said two-phase composite particles embedded therein.

* * * * *